(12) United States Patent
Ludwig et al.

(10) Patent No.: US 6,655,889 B2
(45) Date of Patent: Dec. 2, 2003

(54) WASHER FOR A CHEMICAL ANCHOR

(75) Inventors: Wolfgang Ludwig, Schwabmünchen (DE); Erich Leibhard, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/093,207

(22) Filed: Mar. 7, 2002

(65) Prior Publication Data
US 2002/0125647 A1 Sep. 12, 2002

(30) Foreign Application Priority Data
Mar. 9, 2001 (DE) .......................... 101 11 470

(51) Int. Cl.⁷ ................................. F16B 43/00
(52) U.S. Cl. .................... 411/531; 411/82.1; 411/258; 411/930
(58) Field of Search ................ 411/82, 82.1, 258, 411/531, 534, 930

(56) References Cited

U.S. PATENT DOCUMENTS 277,735 A * 5/1883 Irvine et al. ............. 411/82.1
3,204,416 A 9/1965 Williams
4,139,323 A 2/1979 Brandsetter

FOREIGN PATENT DOCUMENTS

FR 2122429 9/1972

* cited by examiner

Primary Examiner—Neill Wilson
(74) Attorney, Agent, or Firm—Sidley Austin Brown & Wood, LLP

(57) ABSTRACT

A substantially cylindrical washer having two arch-shaped channels 7, on a face on the bore hole side of the washer, wherein said channels connect an opening 2 with a through passage 3. The opening 2 is configured for the passage of an anchor rod and the through passage 3 is configured for filling a mortar mass into the bore hole. The channels 7 open relative to the bore hole and include a substantially semi-circular cross-section to assure the high tensile strength of the washer.

6 Claims, 2 Drawing Sheets

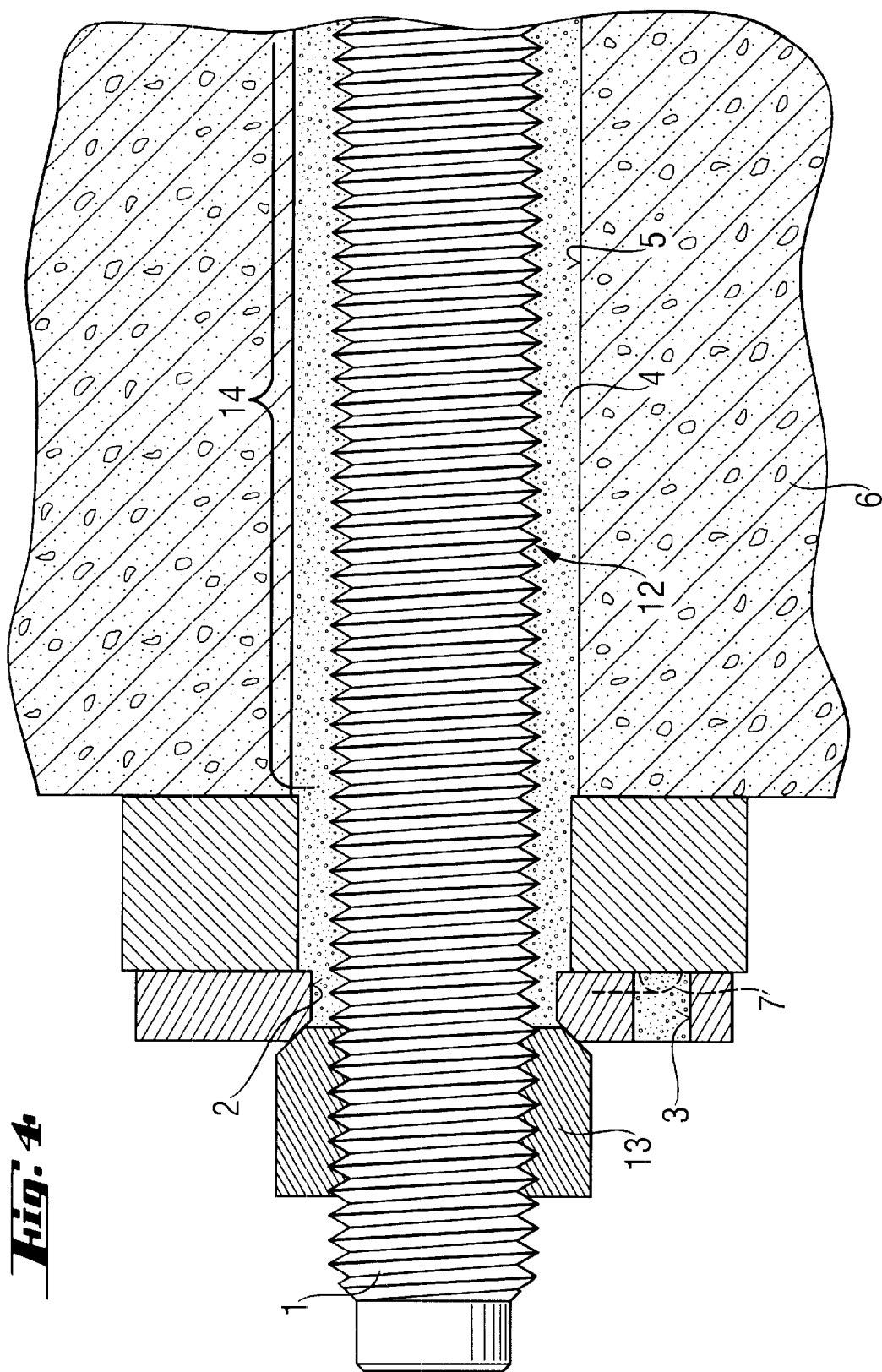

WASHER FOR A CHEMICAL ANCHOR

BACKGROUND OF THE INVENTION

The invention relates to a washer for an anchor rod, wherein the anchor rod is fastened in a bore hole by a mortar having an opening for the passage there-through of the anchor rod and a passage for the introduction of the mortar mass into the bore hole.

Known washers of the type described above are used, for example, with a mountain rock anchor. A rod-shaped anchoring means, for example, an anchor rod, is introduced in a surface that includes a bore hole. The washer is positioned on the end opposite the setting end of the anchoring means, wherein the washer has an opening for the reception of the anchor. A filler mass, particularly, a mortar mass, is introduced into an intermediate space, formed by the wall of the bore hole and the outer contour of the anchoring means, using a through passage arranged in the washer. The filler mass, contained, for example, in cartridges, can be filled into the bore hole using a cartridge compression device. The washer at least partially seals the opening of the bore hole because the washer lies on the top surface.

DE-A1-2102391 discloses a washer comprising an opening for the through passage of an anchor rod and a through passage for the introduction of a mortar mass.

The advantage of the known prior art is that it is simple to set the anchor rod in the bore hole because a known washer is used. The disadvantage of the known prior art is that the mortar mass must be located very close to the opening for receiving the anchor rod, when the space between the anchor rod and the wall of the bore hole through passage is small. In such an assembly, the risk of breakage of the washer increases drastically.

SUMMARY OF THE INVENTION

The object of the present invention is to create a washer that is also suitable for filling small spaces between the anchor rod and the wall of the bore hole through passage. Furthermore, the washer should have a high break strength.

In accordance with the invention, the opening for receiving the anchor rod and the through passage for filling of the filler mass are connected by at least one channel, whereby the course of the channel deviates from a common axis of the through passage and the opening.

The filler mass is conveyed via the channel to the space between the anchor rod and the wall of the bore hole through passage. Optionally, in such an embodiment, the through passage can be arranged on the washer. A blind bore hole can be substituted for the through passage and can be in angular communication with the channel. The channel can be configured closed or even open. Fracture along the channel is prevented by the configuration of the channel out of the common axis of the through passage and the opening. The advantage of such an embodiment is the non-straight linear structure of the channel which provides increased stability.

The opening and the through passage are preferably connected by at least two channels to prevent greater weakening of the washer near the channel. Moreover, such an arrangement prevents closure of the channels, for example, by the anchor rod.

In a further preferred embodiment, the channels are situated arc-shaped along a disc plane to provide a channel geometry that affords optimal fracture strength. The curved design of the channels prevents a fracture along the channel.

Advantageously, the channels are arranged on the side of the washer facing the bore hole and are at least partially open on that side. Such an arrangement provides a more economical production of the washer. Further, in such an embodiment, there is no clogging of the channels, which prevents the filler mass from passing through prior to the setting process. The user can, thus, easily check the functionality of the channels and undertake cleaning without significant effort.

The sum of the inner diameter of the channels is, preferably, approximately equal to the inner diameter of the through passage, so that no excessive resistance is generated when the filler mass is being filled, via the channels. The inside diameter of the filling apparatus used is particularly relevant; overall, the channels have the same conveyance capacity as the filling apparatus.

Preferably, the side of the washer remote from the bore hole has a conical recess arranged coaxial with the opening to receive a high tensile load. A nut threaded onto the anchor rod has, on a side adjacent to the bore hole, an end region complementary to the conical recess.

The channels are, preferably, formed using a stamping process to assure economic manufacture of the washer.

BRIEF DESCRIPTION OF THE DRAWINGS

The invention is more fully described below with reference to the following drawings, wherein:

FIG. 4 illustrates a cross-section of the washer of FIG. 1 with a mountain rock anchor.

DETAILED DESCRIPTION

Figure 1:
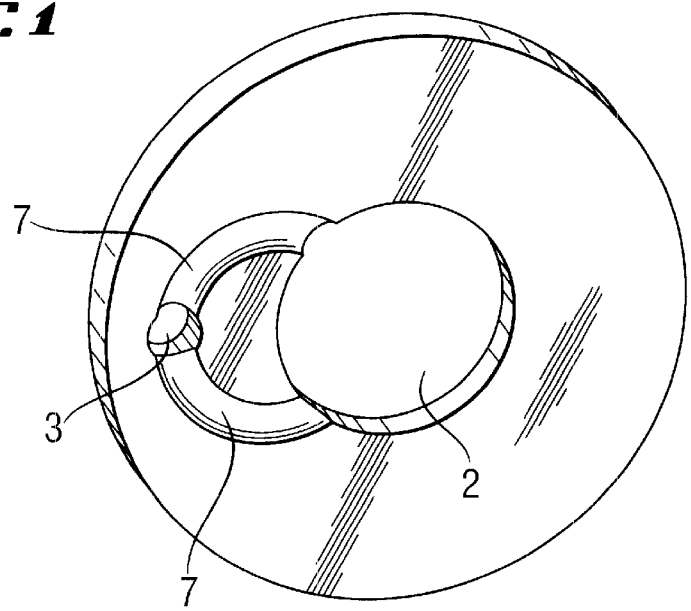
FIG. 1 illustrates a perspective representation of a washer, in accordance with the invention.
Figure 2:
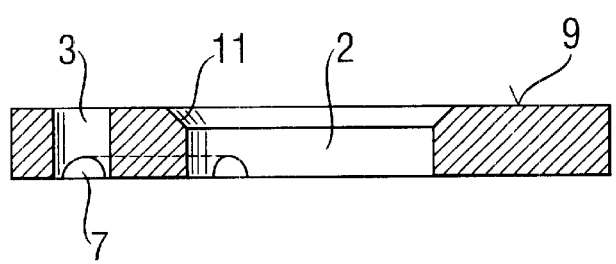
FIG. 2 illustrates a cross-section of the washer of FIG. 1.

Referring to FIGS. 1 to 4, there is shown, a washer, in accordance with the invention, comprising a centrally arranged opening 2 for receiving an anchor rod 1 and a through passage 3 for filling a mortar mass 4. The anchor rod 1 is partially anchored in a constructional component 6 that is provided with a bore hole 5.

Figure 3:
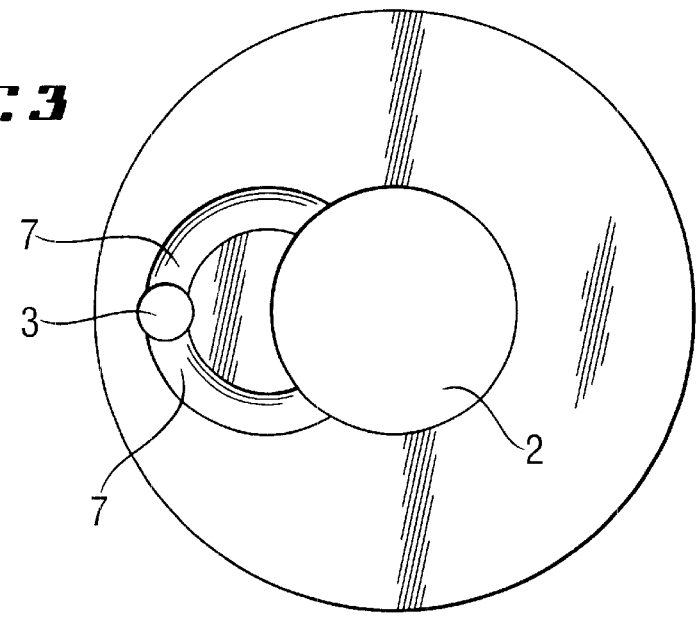
FIG. 3 illustrates a bottom view of the washer of FIG. 1.

The substantially cylindrical washer includes, on its side facing the bore hole 5, two curved channels 7, which connects the opening 2 with the through passage 3. The channels 7 are open relative to the bore hole 5 and form a substantially semicircular shaped cross-section, as is shown in FIG. 3. The two channels 7 lie in a plane transverse to the longitudinal axis of the opening 2.

The opening 2 includes a conical recess 11, which is coaxial with the opening 2, on the side 9 of the washer remote from the bore hole 5. FIG. 4 shows a washer, in accordance with the invention, used with an injection anchor 12. The injection anchor 12 has, at its end facing in the setting direction, an anchor segment 14 for chemically anchoring the injection anchor 12 in a constructional component 6. A nut 13 secures the washer on the injection anchor 12. In this case, the setting-side end of the nut is configured complementary to the recess 11.

What is claimed is:

1. A washer for fixation of an anchor rod (1) in a bore hole (5) by means of a mortar mass, said washer comprising an opening (2) for the passage of the anchor rod (1) and a through passage (3) for the filling of the mortar mass into the bore hole (5), wherein at least one channel (7) connects the opening (2) with the through passage (3) and wherein a course of the at least one channel (7) deviates from a common axis of the through passage (3) and the opening (2).

2. The washer of claim 1, wherein the channels (7) are arch-shaped along a disc plane.

3. The washer of claim 1, wherein the sum of the inside diameter of each of the channels (7) corresponds to the inside diameter of the through passage (3).

4. The washer of claim 1, wherein the side (9) of the washer facing away from the bore hole (5) has a conical recess (11) coaxial to the opening (2).

5. The washer of claim 1, wherein at least two channels (7) connect the opening (2) with the through passage (3).

6. The washer of claim 1, wherein the channels (7) are arranged on a side of the washer facing the bore hole (5) and are at least partially open to said side.

* * * * *